(12) United States Patent
Moss et al.

(10) Patent No.: US 10,953,924 B2
(45) Date of Patent: Mar. 23, 2021

(54) BOLTED CASTING TO CASTING FLEXIBLE BODY VARIANT SHOCK TOWER SYSTEM

(71) Applicant: GM GLOBAL TECHNOLOGY OPERATIONS LLC, Detroit, MI (US)

(72) Inventors: Edward D. Moss, Commerce Township, MI (US); Mark J. McGuire, Amherstburg (CA); Keith J. Saari, Macomb Township, MI (US); Jagmail Singh Cheema, La Salle (CA)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 16/514,535

(22) Filed: Jul. 17, 2019

(65) Prior Publication Data

US 2021/0016834 A1  Jan. 21, 2021

(51) Int. Cl.
```
B60J 7/00        (2006.01)
B62D 21/15       (2006.01)
B62D 25/24       (2006.01)
B62D 25/08       (2006.01)
B62D 33/04       (2006.01)
```
(52) U.S. Cl.
CPC ......... *B62D 21/152* (2013.01); *B62D 25/088* (2013.01); *B62D 25/24* (2013.01); *B62D 33/044* (2013.01)

(58) Field of Classification Search
CPC .......... B62D 25/088; B62D 9/02; B62K 5/10; B62K 5/05; B60G 2300/122; B60G 2204/128
See application file for complete search history.

(56) References Cited

U.S. PATENT DOCUMENTS

| | | | | |
|---|---|---|---|---|
| 4,810,003 A * | 3/1989 | Pinch | .................... | B60G 13/006 280/124.155 |
| 4,958,849 A * | 9/1990 | Pinch | .................... | B60G 15/068 248/632 |
| 5,375,870 A * | 12/1994 | Smith | .................... | B60G 11/16 180/297 |
| 5,456,517 A * | 10/1995 | Kalian | ................. | B60G 15/068 164/47 |
| 5,536,035 A * | 7/1996 | Bautz | ....................... | B60G 3/20 280/124.139 |
| 6,149,171 A * | 11/2000 | Bono | ..................... | B60G 11/16 280/124.179 |
| 8,973,980 B2 * | 3/2015 | Mildner | ............... | B62D 29/041 296/193.09 |
| 9,758,195 B2 * | 9/2017 | Zornack | ............... | B62D 25/088 |
| 9,878,742 B2 * | 1/2018 | Kowaki | ............... | B60G 15/067 |
| 9,944,330 B2 * | 4/2018 | Kowaki | ............... | B60G 15/067 |
| 10,618,484 B1 * | 4/2020 | Barman | ............... | B62D 25/082 |

(Continued)

*Primary Examiner* — Kiran B Patel
(74) *Attorney, Agent, or Firm* — Quinn IP Law

(57) ABSTRACT

A system for providing multiple variations of shock tower assemblies with a common vehicle body is provided. The system includes the common vehicle body including a vehicle body member comprising a plurality of bolt holes and a shock tower assembly. The shock tower assembly includes a bolt-on shock tower cap comprising a shock receiving cavity, a plurality of bolt fasteners attaching the bolt-on shock tower cap to the vehicle body member at the plurality of bolt holes, and shock tower components including a shock device. The shock tower components are configured to matingly engage with the shock receiving cavity.

10 Claims, 6 Drawing Sheets

(56) References Cited

U.S. PATENT DOCUMENTS

| | | | | |
|---|---|---|---|---|
| 2007/0215402 A1* | 9/2007 | Sasaki | B62D 25/088 | |
| | | | 180/232 | |
| 2012/0169023 A1* | 7/2012 | Rawlinson | B62D 25/088 | |
| | | | 280/124.155 | |
| 2014/0097590 A1* | 4/2014 | Yoo | B60G 15/00 | |
| | | | 280/124.155 | |
| 2015/0360723 A1* | 12/2015 | Matsuo | B62D 29/007 | |
| | | | 296/193.01 | |
| 2015/0367888 A1* | 12/2015 | Amemiya | B62D 21/15 | |
| | | | 296/193.09 | |
| 2016/0200361 A1* | 7/2016 | Goto | B62D 25/088 | |
| | | | 296/203.01 | |
| 2016/0264176 A1* | 9/2016 | Balzer | B62D 27/02 | |
| 2016/0288839 A1* | 10/2016 | Fukuoka | B62D 25/082 | |
| 2016/0355064 A1* | 12/2016 | Amemiya | B62D 25/088 | |
| 2017/0174264 A1* | 6/2017 | Maruyama | B62D 25/16 | |
| 2018/0029643 A1* | 2/2018 | Maruyama | B62D 25/088 | |
| 2018/0029649 A1* | 2/2018 | Maruyama | B62D 25/088 | |
| 2018/0345746 A1* | 12/2018 | Anderson | B60G 15/067 | |
| 2019/0210655 A1* | 7/2019 | Cao | B62D 25/088 | |
| 2019/0210656 A1* | 7/2019 | Guariento | B62D 29/008 | |
| 2020/0086921 A1* | 3/2020 | Watanabe | B62D 21/11 | |
| 2020/0086927 A1* | 3/2020 | Watanabe | B60G 15/067 | |

* cited by examiner

BOLTED CASTING TO CASTING FLEXIBLE BODY VARIANT SHOCK TOWER SYSTEM

INTRODUCTION

The disclosure generally relates to a suspension system for an automobile.

A vehicle body includes a structural system useful for providing rigidity and force transmission through the body. The structural system includes a group of connected structural members which are frequently shaped tubular members, which can include a wide variety of cross-sectional shapes.

Vehicles include suspension systems that are useful to cushion a vehicle from rough features upon a roadway. Suspensions include shock towers which each include a shock device which include an internal spring and damper mechanism to filter out bumps or unsteadiness from the vehicle suspended by the shock towers.

Different vehicles require different shock devices. Different shock devices require different amounts of space within a vehicle and require different structural characteristics.

SUMMARY

A system for a vehicle is provided. The system includes a common vehicle body for the vehicle including a vehicle body member including a plurality of bolt holes and a shock tower assembly. The shock tower assembly includes a bolt-on shock tower cap including a shock receiving cavity, a plurality of bolt fasteners attaching the bolt-on shock tower cap to the vehicle body member at the plurality of bolt holes, and shock tower components including a shock device. The shock tower components are configured to matingly engage with the shock receiving cavity.

In some embodiments, the bolt-on shock tower cap is constructed with die cast aluminum. In some embodiments, the bolt-on shock tower cap includes reinforcement ribs. In some embodiments, the reinforcement ribs are oriented in an in-vehicle up direction. In some embodiments, the reinforcement ribs comprise a first set of reinforcement ribs, and the vehicle body member includes a second set of reinforcement ribs perpendicular to the first set of reinforcement ribs.

In some embodiments, the shock tower assembly includes a first shock tower assembly variation, wherein the bolt-on shock tower cap includes a first bolt-on shock tower cap, and the system further includes a second shock tower assembly variation including a second bolt-on shock tower cap, wherein the first shock tower assembly variation is configured to be used with the common vehicle body when the vehicle is a rear-wheel drive vehicle, and wherein the second shock tower assembly variation is configured to be used with the common vehicle body when the vehicle is an all-wheel drive vehicle. In some embodiments, the first bolt-on shock tower cap includes a low-profile top. In some embodiments, second first bolt-on shock tower cap includes a tall-profile top. In some embodiments, the first bolt-on shock tower cap and the second bolt-on shock tower cap each utilize a same set of the plurality of bolt holes. In some embodiments, the first bolt-on shock tower cap and the second bolt-on shock tower cap each utilize a different set of the plurality of bolt holes.

In some embodiments, the bolt-on shock tower cap further includes external bolt holes configured to attach a stiffening bar to the bolt-on shock tower cap.

According to one alternative embodiment, a system for a vehicle is provided. The system includes a common vehicle body for the vehicle including a vehicle body member including a plurality of bolt holes, a first shock tower assembly variation, and a second shock tower assembly variation. The first shock tower assembly variation includes a first bolt-on shock tower cap including a first shock receiving cavity, a plurality of bolt fasteners configured to attach the first bolt-on shock tower cap to the vehicle body member at the plurality of bolt holes, and a first plurality of shock tower components including a first shock device. The first plurality of shock tower components is configured to matingly engage with the first shock receiving cavity. The second shock tower assembly variation includes a second bolt-on shock tower cap including a second shock receiving cavity, the plurality of bolt fasteners configured to attach the second bolt-on shock tower cap to the vehicle body member at the plurality of bolt holes, and a second plurality of shock tower components including a second shock device. The second plurality of shock tower components is configured to matingly engage with the second shock receiving cavity. The first shock tower variation is configured to be used with a first vehicle variation. The second shock tower variation is configured to be used with a second vehicle variation.

In some embodiments, the first vehicle variation includes a rear-wheel drive variation, the first bolt-on shock tower cap includes a low-profile top, the second vehicle variation includes an all-wheel drive variation, and the second bolt-on shock tower cap includes a tall-profile top. In some embodiments, the second bolt-on shock tower cap includes at least one external bolt hole configured to attach a stiffening bar. In some embodiments, the second bolt-on shock tower cap is configured to hold the second shock tower assembly higher in relation to the common vehicle body than the first bolt-one shock tower cap holds the first shock tower assembly in relation to the common vehicle body.

According to one alternative embodiment, a method for providing multiple variations of shock tower assemblies for a vehicle with a common vehicle body is provided. The method includes equipping a common vehicle body including a vehicle body member with a shock tower rail and selecting a desired front shock tower assembly variation from a first front shock tower assembly variation including a low-profile bolt-on shock tower cap and a second front shock tower assembly including a tall-profile bolt-on shock tower cap. The selecting includes, if the vehicle includes a rear-wheel drive vehicle, selecting the second front shock tower assembly variation and, if the vehicle includes a front axle with drive, selecting the second front shock tower assembly variation. The method further includes affixing the desired front shock tower assembly to the shock tower rail with a plurality of bolt fasteners.

In some embodiments, the method further includes, if the vehicle includes the front axle with drive, affixing a stiffening bar to the tall-profile bolt-on shock tower cap.

In some embodiments, the method further includes equipping the low-profile bolt-on shock tower cap with reinforcement ribs oriented in an in-vehicle up direction.

In some embodiments, the method further includes equipping the low-profile bolt-on shock tower cap with a first set of reinforcement ribs oriented in an in-vehicle up direction and equipping the common vehicle body with a second set of reinforcement ribs oriented perpendicularly to the first set of reinforcement ribs.

The above features and advantages and other features and advantages of the present disclosure are readily apparent from the following detailed description of the best modes for carrying out the disclosure when taken in connection with the accompanying drawings.

DETAILED DESCRIPTION

Figure 1:
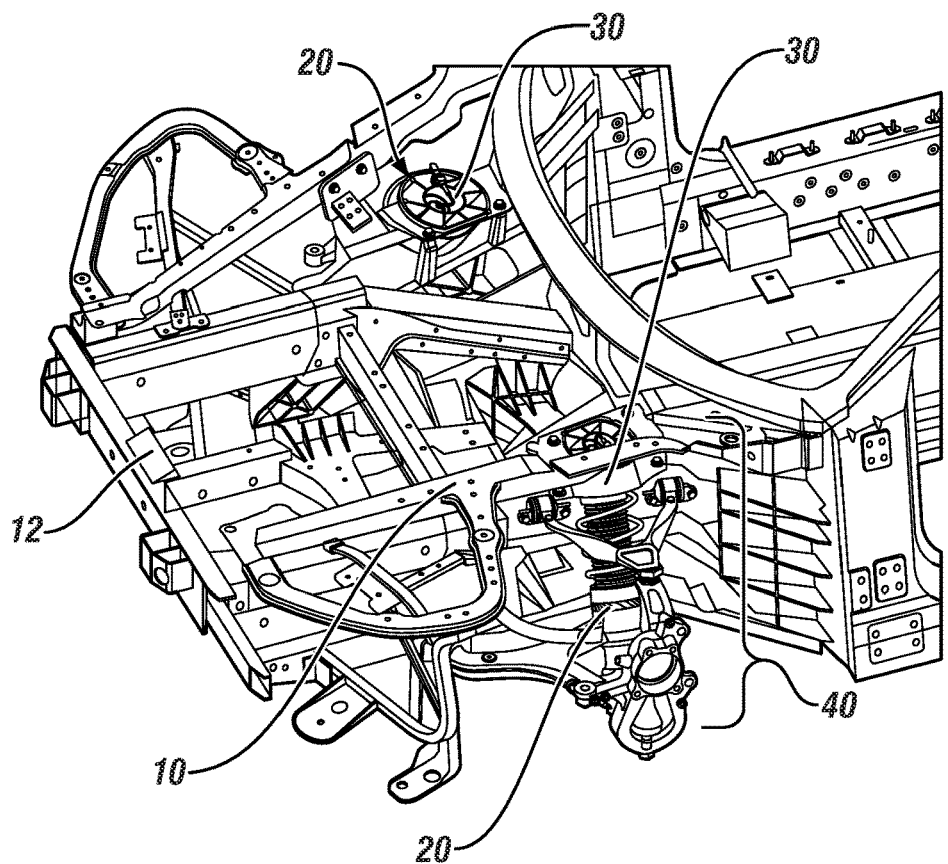
FIG. 1 illustrates in a top perspective view an exemplary vehicle body including two front shock tower assemblies each including a bolt-on shock tower cap, in accordance with the present disclosure.

A vehicle body and chassis system includes many components that are useful to operating an associated vehicle. One included system includes a suspension system including a plurality of shock towers including shock devices useful for providing a smooth ride over a rough road. Shock towers are attached to the vehicle body and chassis system, such that force transmitted through the shock device is transmitted to the vehicle body and chassis system, and such that the shock tower is securely affixed to the vehicle body and chassis system. In one embodiment a shock tower cap is welded to the vehicle body and includes a shock receiving cavity configured to matingly interface with the shock device and/or components of the shock tower. Such a shock tower cap is rigid and sturdy enough to withstand the forces of the suspension system acting upon the vehicle body.

A single vehicle body and chassis system or vehicle body can be used in one line of vehicles with multiple options. For example, a same model of vehicle can be provided with rear-wheel drive or all-wheel drive options. Each option may include different suspension system requirements, mandating different shock towers be utilized with the different options. A rear-wheel drive vehicle may require an exemplary low-profile shock tower, and an all-wheel drive vehicle may require an exemplary tall-profile shock tower. Different package sizes and shock tower lengths cause the required interface with the vehicle body, the shock tower cap, to change in geometry and location. Typical vehicles include different vehicle bodies for different shock towers, with different welded on shock tower caps being required for different options. Such variations in vehicle body design cause issues. For example, manufacturing costs and times are increased based upon a manufacturing facility having to track different variations of vehicle body. Further, different welded on features can create systems dynamics issues.

A modular or interchangeable bolt-on shock tower cap is provided that permits a common vehicle body to be used across multiple options for a single vehicle model. A single vehicle body can include a shock tower cap mounting location with bolt holes that are common for a plurality of bolt-on shock tower caps. The provided system includes a unique shock tower structural system in which a variant specific high integrity die cast shock tower cap may be bolted to a common shock tower/rail high integrity die casting. The large lower shock tower/rail casting is common for both rear-wheel and all-wheel drive variants, while the bolt-on shock tower cap is variant specific, with a low-profile cap being utilized for the non-driven front axle variant, and a tall-profile cap being incorporated for the driven front axle variant. Additionally, the unique bolt-on shock tower cap can be constructed as a die-cast part, with a vertical (in vehicle) die pull direction increasing structural efficiency with advantageous rib patterns for vertical loading, while a vehicle body member may be constructed as a die-cast part, with a cross (in vehicle) die pull direction enables additional ribbing perpendicular to the die pull direction of the attached bolt-on shock tower cap.

FIG. 1 illustrates in a top perspective view an exemplary vehicle body including two front shock tower assemblies each including a bolt-on shock tower cap. Vehicle body 10 is illustrated including a plurality of vehicle body structural members that provide support and rigidity to the vehicle body. In one embodiment, vehicle body is constructed in part or in totality with aluminum. The various vehicle body structural members may be welded together. A front 12 or vehicle-forward end of vehicle body 10 is illustrated. Two shock tower assemblies 40 are illustrated, one on a driver-side of the vehicle body and one on a passenger-side of the vehicle, are illustrated. Which side is the driver-side and which side is the passenger-side can vary depending upon vehicle configuration. Each shock tower includes shock tower components 20 and bolt-on shock tower cap 30. Shock tower components 20 may include a shock device, a spring, control arms, and other devices required to operate a suspension system.

Figure 2:
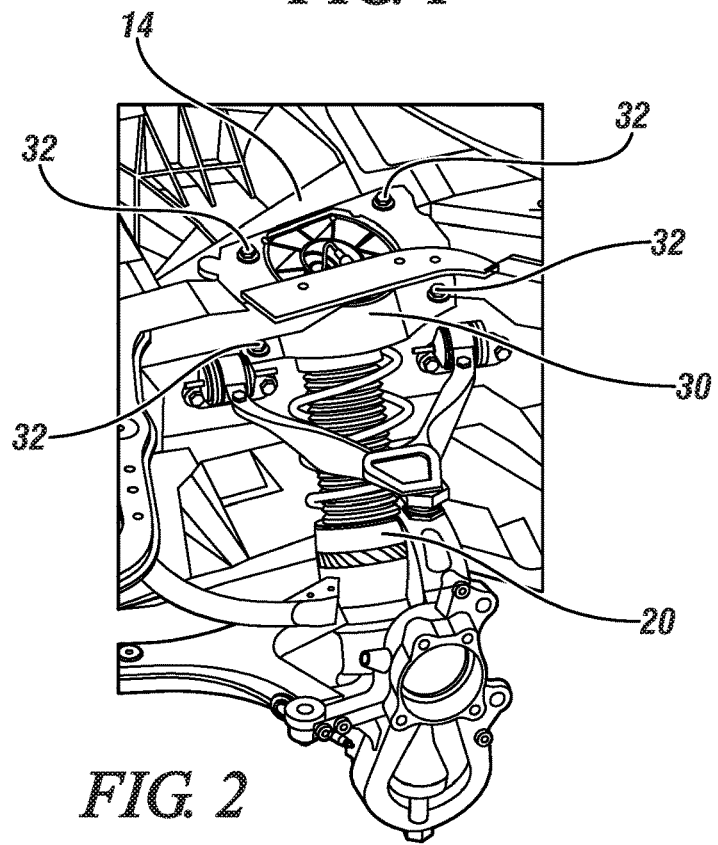
FIG. 2 illustrates a front shock tower assembly of FIG. 1 in detail, in accordance with the present disclosure.

FIG. 2 illustrates a front shock tower assembly of FIG. 1 in detail. Bolt-on shock tower cap 30 is illustrated, fastened to vehicle body member 14 with four exemplary bolt fasteners 32. Any number of bolt fasteners 32 can be used, depending upon the particular requirements of the vehicle and suspension system. Shock tower components 20 are illustrated matingly engaged with bolt-on shock tower cap 30. In one embodiment bolt-on shock tower cap 30 and vehicle body member 14 can both be die-cast aluminum, with a die pull direction of the cap being vertical, and with the die pull direction of the member being perpendicular to the die pull direction of the cap to improve structural efficiencies. In one embodiment, vehicle body member 14 can be described as a common shock tower rail die casting.

Figure 3:
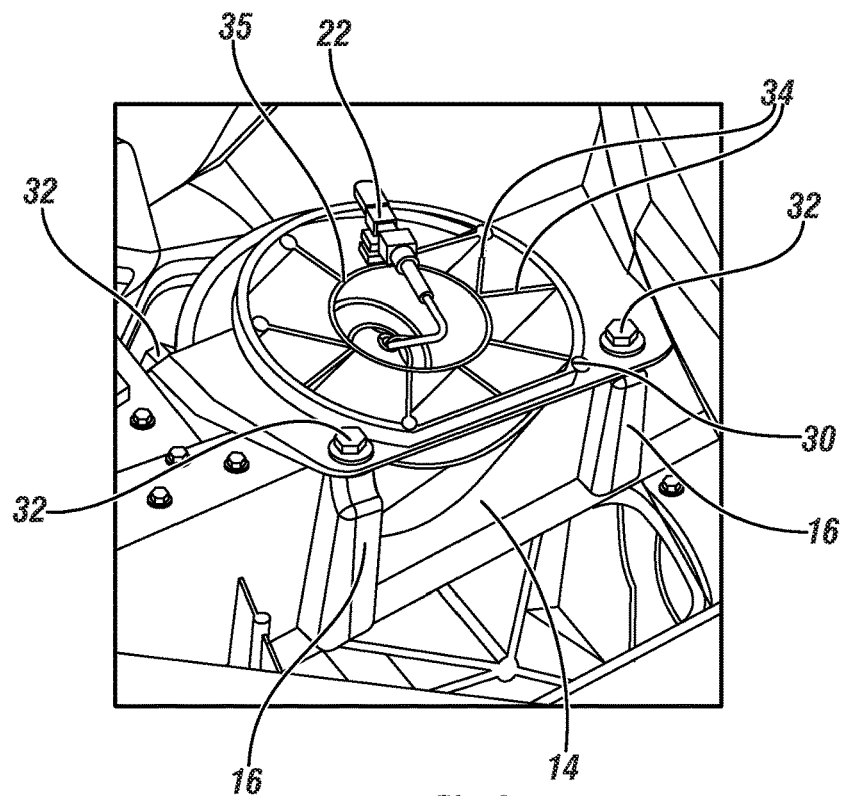
FIG. 3 illustrates a bolt-on shock tower cap of FIG. 1 in detail, in accordance with the present disclosure.

FIG. 3 illustrates a bolt-on shock tower cap of FIG. 1 in detail. Bolt-on shock tower cap 30 is illustrated including a plurality of bolt fasteners 32 fastening bolt-on shock tower 30 to vehicle body member 14. Vehicle body member 14 can include a plurality of bolt mounting bosses 16 with reinforced material sections to provide adequate strength for bolt fasteners 32 to securely hold bolt-on shock tower cap 30 in place. Bolt-on shock tower cap 30 is illustrated including a low-profile top 35, with the exemplary top surface of bolt-on shock tower cap 30 being substantially flat with the top-most bolt fasteners 32 attached to vehicle body member 14.

Reinforcement ribs 34 are illustrated situated above illustrated shock tower components in such a way that reinforcement ribs 34 are substantially co-planar with low-profile top 35. The illustrated shock tower components include shock device pneumatic interface 22 extending upwardly through an optional center hole in bolt-on shock tower cap 30.

Bolt-on shock tower cap 30 can be constructed with multiple different materials and with different physical characteristics. An exemplary bolt-on shock tower cap can include a die-cast aluminum configuration. An alternative configuration could include steel or other metal such as titanium. Different numbers, sizes, and locations of reinforcing ribs can be used to make the bolt-on shock tower cap stronger or lighter.

Figure 4:
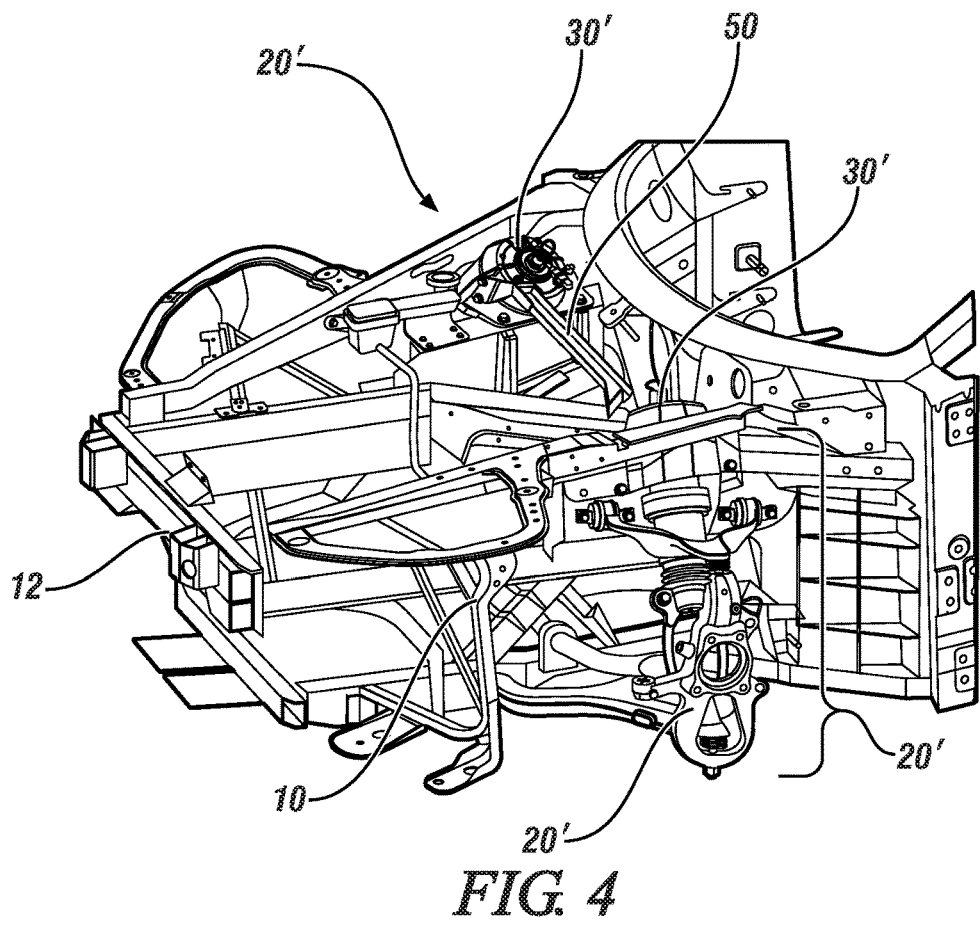
FIG. 4 illustrates in a top perspective view the vehicle body of FIG. 1 including alternative front shock tower assemblies each including alternative bolt-on shock tower cap enabling use of the alternative front shock tower assemblies with the vehicle body, in accordance with the present disclosure.

FIG. 4 illustrates in a top perspective view the vehicle body of FIG. 1 including alternative front shock tower assemblies each including alternative bolt-on shock tower cap enabling use of the alternative front shock tower assemblies with the vehicle body. Vehicle body 10 including front 12 is illustrated. Shock tower components 20' are illustrated as part of shock tower assembly 40'. Shock tower components 20' are elevated as compared shock tower components 20 of FIG. 1 to accommodate a front driven axle. As a result, an upper end of shock tower components 20' must extend further upward in relation to vehicle body 10 as compared to shock tower components 20 of FIG. 1 in relation to vehicle body 10. As a result, bolt-on shock tower cap 30 of FIG. 1 cannot be used with shock tower components 20' of FIG. 4. Instead, bolt-on shock tower caps 30' are illustrated as part of shock tower assemblies 40', with bolt-on shock tower caps 30' each including higher profiles and higher internal cavities enabling the use of longer shock tower components.

In one embodiment, different bolt-on shock tower caps can further include other details. For example, bolt-on shock tower caps 30' include exemplary external bolt holes enabling connection of a stiffening bar 50 attached to both bolt-on shock tower caps 30'. Such added details can be used in an exemplary all-wheel drive vehicle, where the front wheels are subject to more extreme forces than a rear-wheel drive vehicle, where the front wheels are only used for steering and are subject to less extreme forces.

The disclosed bolt-on shock tower cap provides multiple variation for shock systems. It also includes the structural connection and continuity that the cap provides for the upper rail system to maintain vehicle body structural performance linearly (in all X,Y Z directions) and torsionally.

Figure 5:
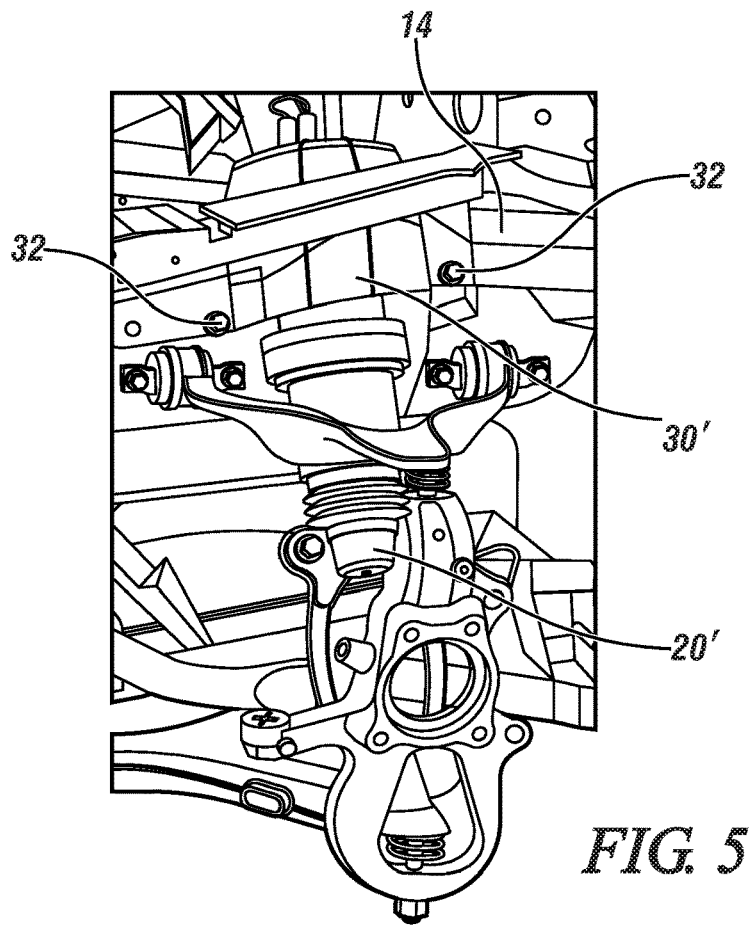
FIG. 5 illustrates an alternative front shock tower assembly of FIG. 4 in detail, in accordance with the present disclosure.

FIG. 5 illustrates an alternative front shock tower assembly of FIG. 4 in detail. Bolt-on shock tower cap 30' is illustrated, fastened to vehicle body member 14 with four exemplary bolt fasteners 32. Shock tower components 20' are illustrated matingly engaged with bolt-on shock tower cap 30'.

Figure 6:
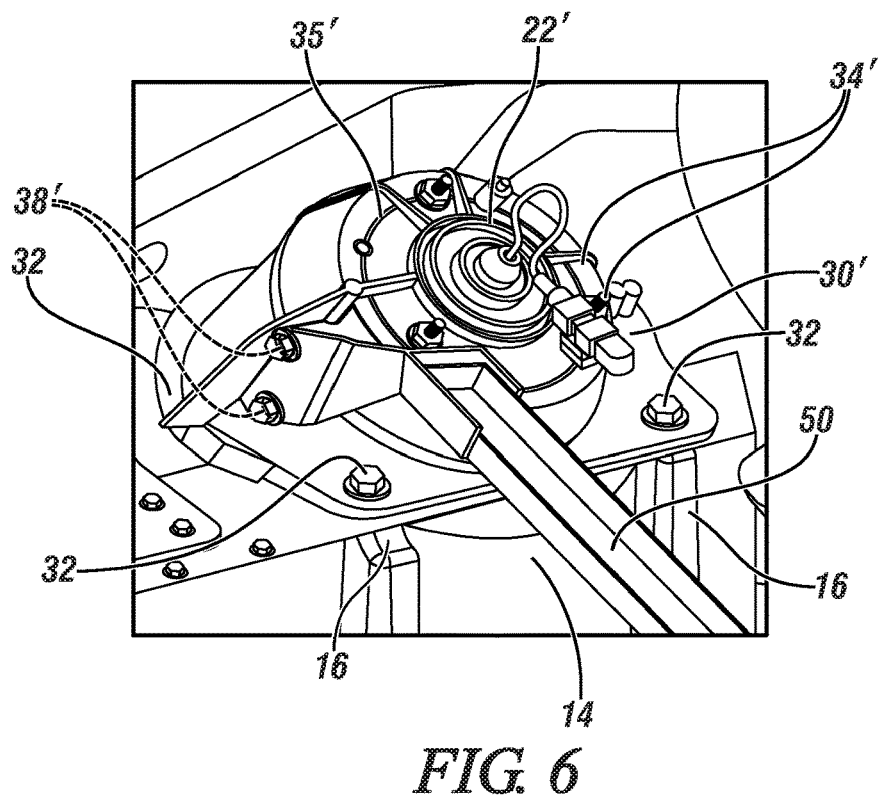
FIG. 6 illustrates an alternative bolt-on shock tower cap of FIG. 1 in detail, in accordance with the present disclosure.

FIG. 6 illustrates an alternative bolt-on shock tower cap of FIG. 4 in detail. Bolt-on shock tower cap 30' is illustrated including a plurality of bolt fasteners 32 fastening bolt-on shock tower 30' to vehicle body member 14. Vehicle body member 14 can include a plurality of bolt mounting bosses 16 with reinforced material sections to provide adequate strength for bolt fasteners 32 to securely hold bolt-on shock tower cap 30 in place. Bolt-on shock tower cap 30' is illustrated including a tall-profile top 35', with the exemplary top surface of bolt-on shock tower cap 30' projecting upwardly above the top-most bolt fasteners 32 attached to vehicle body member 14. Reinforcement ribs 34' are illustrated situated above illustrated shock tower components in such a way that reinforcement ribs 34 are raised above tall-profile top 35'. The illustrated shock tower components include shock device pneumatic interface 22' extending upwardly through an optional center hole in bolt-on shock tower cap 30'. Stiffening bar 50 is illustrated attached to bolt-on shock tower cap 30' at external bolt holes 38'.

Vehicle body member 14 can include a single set of bolt holes or integrated nuts used to fasten various bolt-on shock tower caps to the single set of bolt holes. In another embodiment, vehicle body member can include compatible mounting features enabling various different bolt-on shock tower caps to seat upon the vehicle body member and can include different bolt hole locations which can be used by only some of the bolt-on shock tower caps. For instance, a vehicle body member can include seven different bolt hole locations configured for three different bolt-on shock tower caps, and each different bolt-on shock tower cap can use four of the seven bolt holes, with none of the bolt-on shock tower caps using the same four bolt holes.

FIGS. 1-6 describe a low-profile bolt-on shock tower cap and a tall-profile bolt-on shock tower cap. It will be appreciated that the low-profile bolt-on shock tower cap is lower vertically in-vehicle when mounted to a shock tower rail than the tall-profile bolt-on shock tower cap mounted to the same shock tower rail. The descriptive terms low-profile and tall-profile are illustrative examples of dimensional or physical changes that could be implemented with variations of shock tower assemblies and matching bolt-on shock tower caps. The descriptive terms low-profile and tall-profile are intended to show an exemplary relationship of the first alternative device to the second alternative device and is not intended to be limiting.

Figure 7:
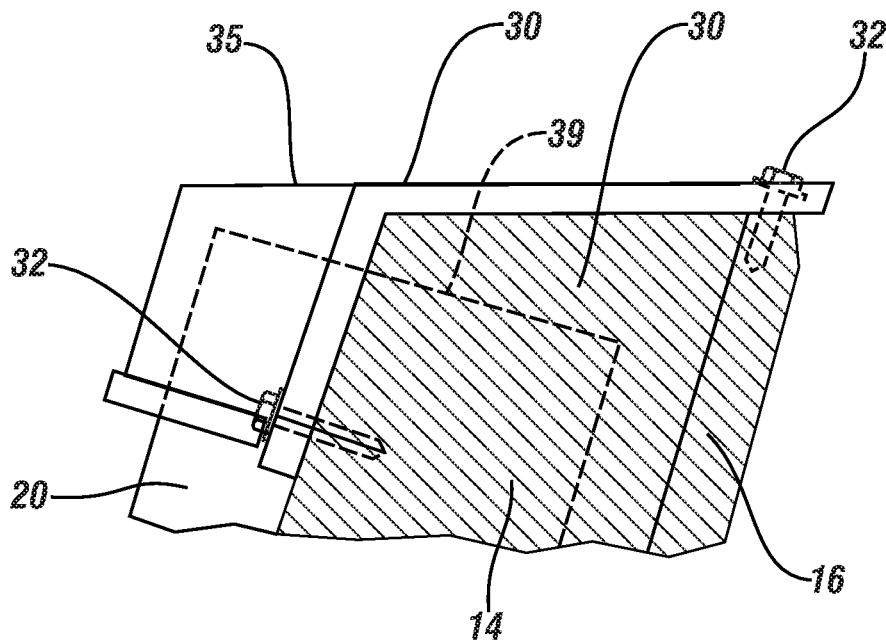
FIG. 7 illustrates in rear view the bolt-on shock tower cap of FIG. 3, in accordance with the present disclosure.

FIG. 7 illustrates in rear view the bolt-on shock tower cap of FIG. 3. Bolt-on shock tower cap 30 is illustrated including a plurality of bolt fasteners 32 fastening bolt-on shock tower 30 to vehicle body member 14. Vehicle body member 14 can include a plurality of bolt mounting bosses 16 with reinforced material sections to provide adequate strength for bolt fasteners 32 to securely hold bolt-on shock tower cap 30 in place. Bolt-on shock tower cap 30 is illustrated including a low-profile top 35, with the exemplary top surface of bolt-on shock tower cap 30 being substantially flat with the top-most bolt fasteners 32 attached to vehicle body member 14. Shock tower components 20 are illustrated generically as a cylinder projecting upwardly into shock receiving cavity 39 of bolt-on shock tower cap 30. It will be appreciated that a particular geometry of shock receiving cavity 39 can be configured to coordinate with the particular shock tower components 20 of a particular system.

Figure 8:
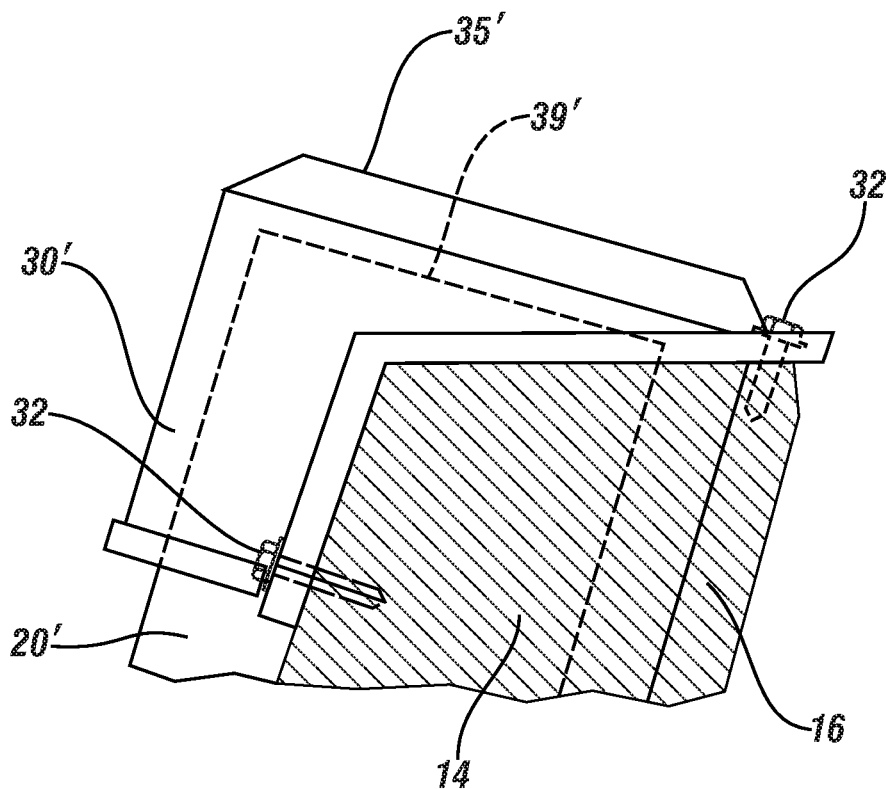
FIG. 8 illustrates in rear view the alternative bolt-on shock tower cap of FIG. 6, in accordance with the present disclosure.

FIG. 8 illustrates in rear view the alternative bolt-on shock tower cap of FIG. 6. Bolt-on shock tower cap 30' is illustrated including a plurality of bolt fasteners 32 fastening bolt-on shock tower 30' to vehicle body member 14. Vehicle body member 14 can include a plurality of bolt mounting bosses 16 with reinforced material sections to provide adequate strength for bolt fasteners 32 to securely hold bolt-on shock tower cap 30' in place. Bolt-on shock tower cap 30' is illustrated including a tall-profile top 35', with the exemplary top surface of bolt-on shock tower cap 30' extending upwardly above the top-most bolt fasteners 32 attached to vehicle body member 14. Shock tower components 20' are illustrated generically as a cylinder projecting upwardly into shock receiving cavity 39' of bolt-on shock tower cap 30'. It will be appreciated that a particular geometry of shock receiving cavity 39' can be configured to coordinate with the particular shock tower components 20 of a particular system.

A number of different shock tower assemblies can be utilized in a common vehicle model. Different bolt-one shock tower caps with different geometries, different weights, different structural properties can be utilized with a common vehicle body. The disclosure is not intended to be limited to the variations in shock tower assemblies or bolt-on shock tower caps disclosed herein.

The vehicle body member can include a geometry configured to be attached to in an area that is configured to receive the bolt-on shock tower cap. Such an area configured to receive the cap can be described as a shock tower rail.

Figure 9:
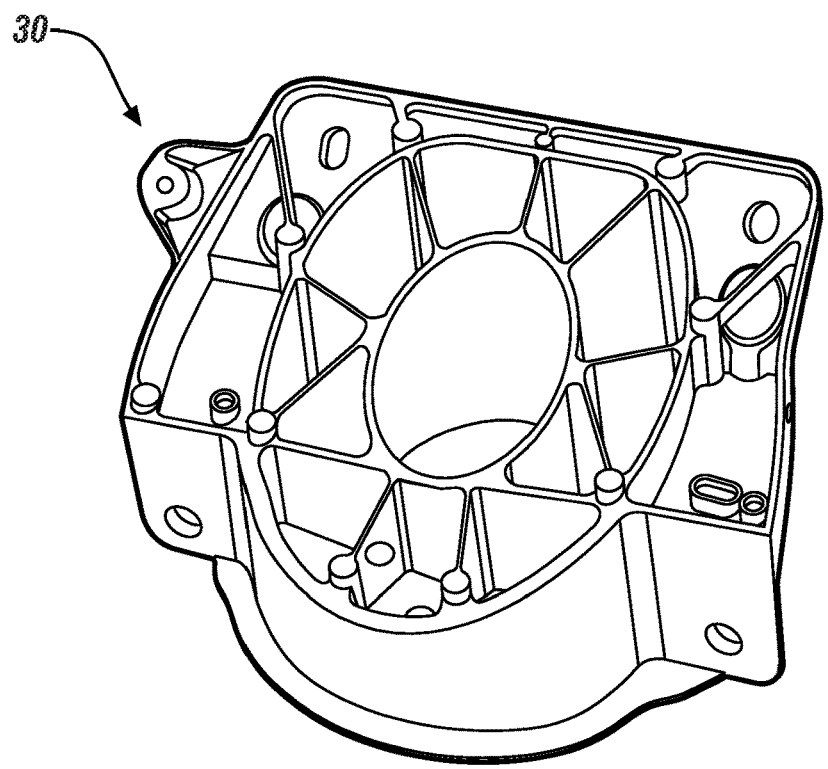
FIGS. 9 and 10 illustrate an exemplary embodiment of the low-profile shock tower cap of FIG. 1, in accordance with the present disclosure.
Figure 10:
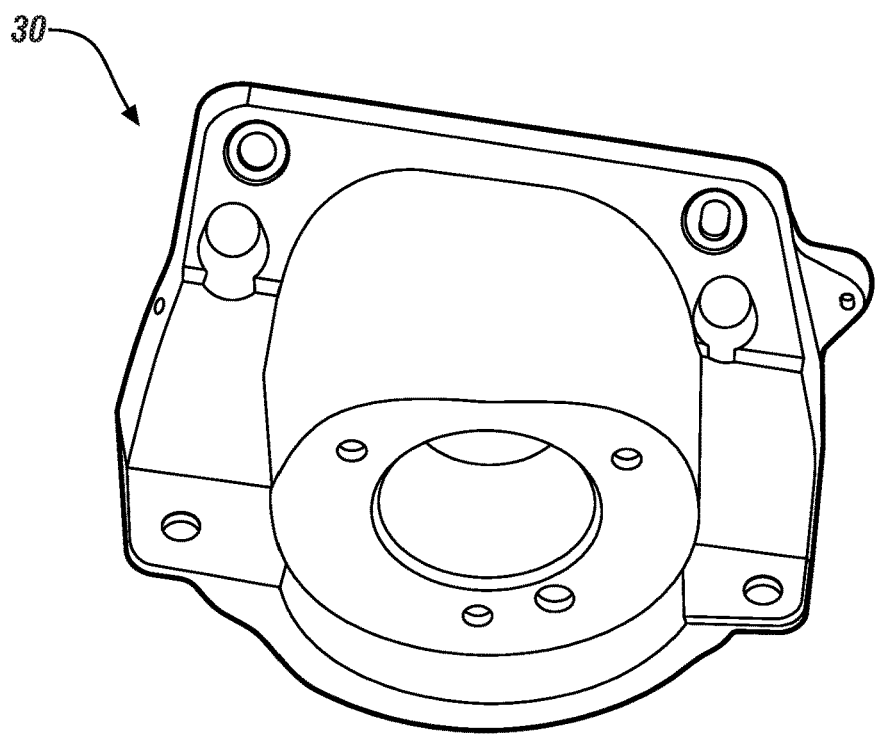

FIGS. 9 and 10 illustrate an exemplary embodiment of the low-profile shock tower cap of FIG. 1, in greater detail. FIG. 9 illustrates low-profile shock tower cap 30 in a top perspective view. FIG. 10 illustrates low-profile shock tower cap 30 in bottom perspective view.

Figure 11:
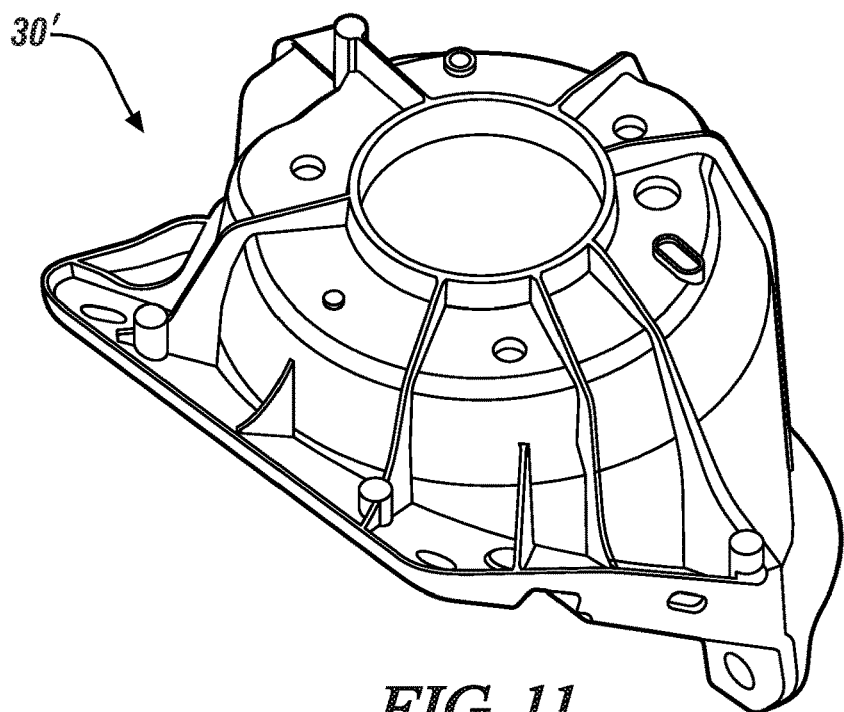
FIGS. 11 and 12 illustrate an exemplary embodiment of the tall-profile shock tower cap of FIG. 4, in accordance with the present disclosure.
Figure 12:
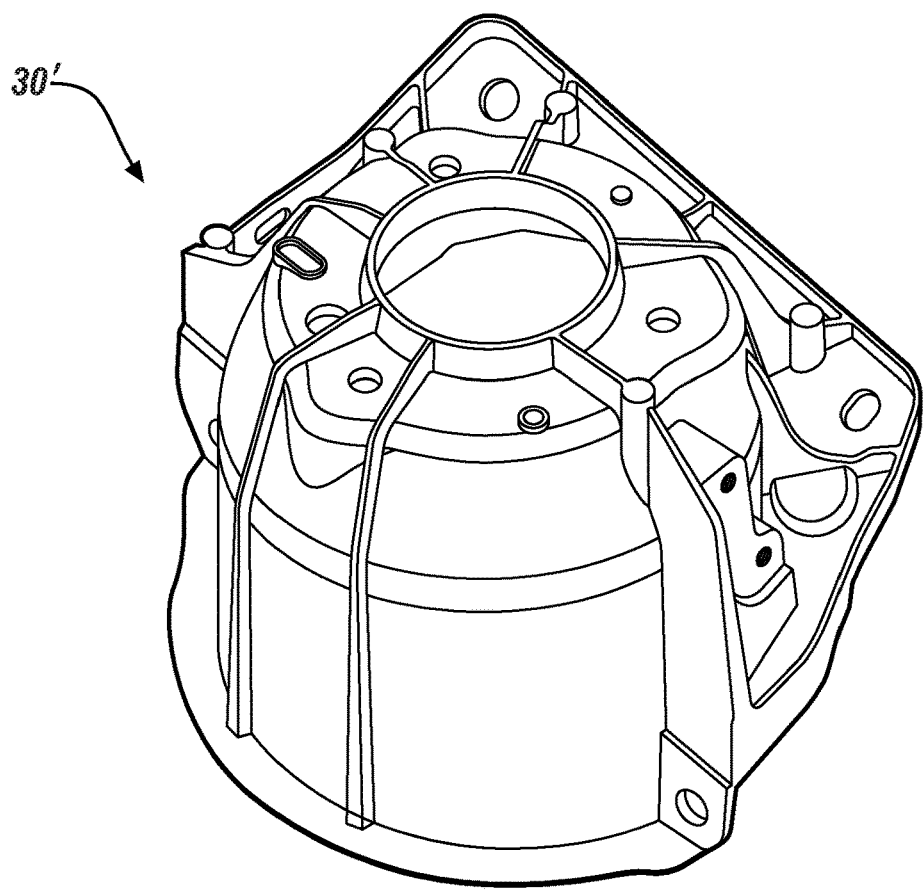

FIGS. 11 and 12 illustrate an exemplary embodiment of the tall-profile shock tower cap of FIG. 4, in greater detail. FIG. 11 illustrates tall-profile shock tower cap 30' in a top perspective view. FIG. 12 illustrates tall-profile shock tower cap 30' in another rotated top perspective view.

While the best modes for carrying out the disclosure have been described in detail, those familiar with the art to which this disclosure relates will recognize various alternative designs and embodiments for practicing the disclosure within the scope of the appended claims.

What is claimed is:

1. A structural system for a vehicle body comprising:
   a plurality of connected structural members, wherein one of the plurality of connected structural members includes a vehicle body member including a plurality of bolt holes; and
   a shock tower assembly, including:
      a bolt-on shock tower cap comprising a shock receiving feature;
      a plurality of bolt fasteners attaching the bolt-on shock tower cap to the vehicle body member at the plurality of bolt holes; and
      a shock device including an internal spring and damper mechanism that is matingly engaged with the shock receiving feature;
   wherein the shock tower assembly enables attachment of one of a plurality of alternative selectable suspension systems to the vehicle body.

2. The system of claim 1, wherein the bolt-on shock tower cap is a die cast element fabricated from aluminum.

3. The system of claim 1, wherein the bolt-on shock tower cap comprises reinforcement ribs.

4. The system of claim 3, wherein the reinforcement ribs are oriented in an in-vehicle up direction.

5. The system of claim 4, wherein the reinforcement ribs comprise a first set of reinforcement ribs; and
   wherein the vehicle body member is a die case element fabricated from aluminum and comprises a second set of reinforcement ribs perpendicular to the first set of reinforcement ribs.

6. The system of claim 1, wherein the bolt-on shock tower cap further comprises external bolt holes configured to attach a stiffening bar to the bolt-on shock tower cap.

7. A structural system for a vehicle body, comprising:
   a plurality of connected structural members, wherein one of the plurality of connected structural members includes a vehicle body member including a plurality of bolt holes; and
   a selected shock tower assembly, including one of:
      a first selectable shock tower assembly comprising:
         a first bolt-on shock tower cap comprising a first shock receiving feature, wherein the first shock receiving feature, when attached to the vehicle body member, is disposed at a first vertical position within the vehicle body;
         a plurality of bolt fasteners configured to attach the first bolt-on shock tower cap to the vehicle body member at the plurality of bolt holes; and
         a first shock device including a first internal spring and damper mechanism that is matingly engaged with the first shock receiving feature; and
      a second selectable shock tower assembly comprising:
         a second bolt-on shock tower cap comprising a second shock receiving feature, wherein the second shock receiving feature, when attached to the vehicle body member, is disposed at a second vertical position within the vehicle, wherein the second vertical position is higher than the first vertical position;
         the plurality of bolt fasteners configured to attach the second bolt-on shock tower cap to the vehicle body member at the plurality of bolt holes; and
         a second shock device including a second internal spring and damper mechanism that is matingly engaged with the second shock receiving feature;
   wherein the first selectable shock tower assembly is attachable to the vehicle body member in a rear-wheel drive variation; and
   wherein the second selectable shock tower assembly is attachable to the vehicle body member in an all-wheel drive variation.

8. The system of claim 7, wherein the second bolt-on shock tower cap comprises at least one external bolt hole configured to attach a stiffening bar.

9. A method for manufacturing a vehicle body, comprising:
   equipping the vehicle body with a structural member including a plurality of bolt holes;
   providing a first selectable front shock tower assembly corresponding to a rear-wheel drive variation of the vehicle;
   providing a second selectable front shock tower assembly corresponding to an all-wheel drive variation of the vehicle;
   monitoring a selected variation of the vehicle;
   when the selected variation of the vehicle includes the rear-wheel drive variation of the vehicle, affixing the first selectable front shock tower assembly to the plurality of bolt holes with a plurality of bolt fasteners; and
   when the selected variation of the vehicle includes the all-wheel drive variation of the vehicle, affixing the second selectable front shock tower assembly to the plurality of bolt holes with the plurality of bolt fasteners;
   wherein the first selectable front shock tower assembly is operable to hold a shock device of the first front shock tower assembly in a relatively lower position in the vehicle; and
   wherein the second selectable front shock tower assembly is operable to hold a shock device of the second front shock tower assembly in a relatively higher position in the vehicle as compared to the relatively lower position.

10. The Method of claim 9, further comprising, when the selected variation of the vehicles includes the all-wheel drive variation of the vehicle, affixing a stiffening bar to the second selectable front shock tower assembly.

* * * * *